No. 610,296. Patented Sept. 6, 1898.
C. E. ALVORD.
SAGE BRUSH GRUBBER.
(Application filed Apr. 22, 1897.)
(No Model.) 2 Sheets—Sheet 1.
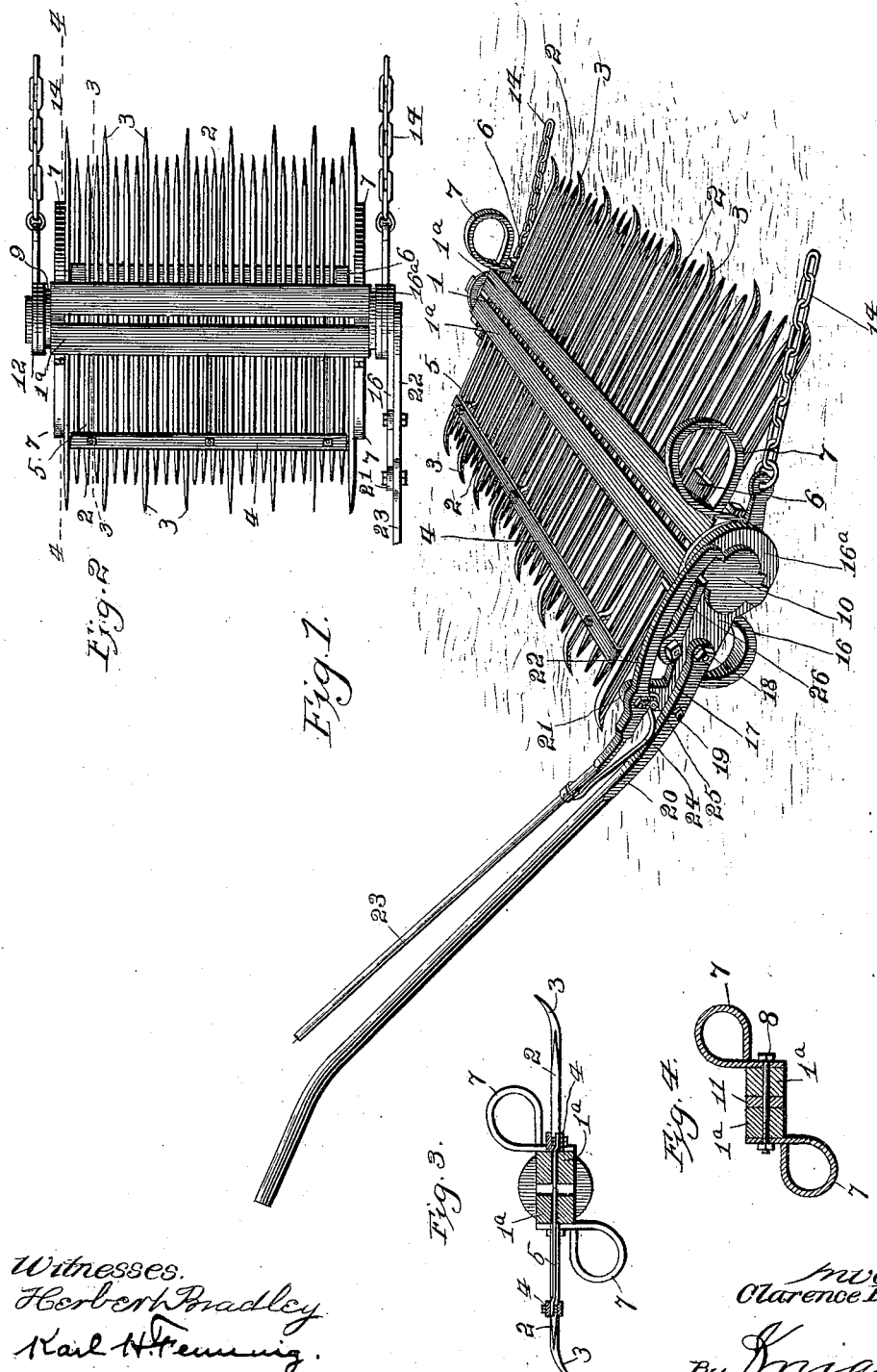
Witnesses.
Herbert Bradley
Karl H. Fleming
Inventor
Clarence E. Alvord
By Knight Bros
Attys.

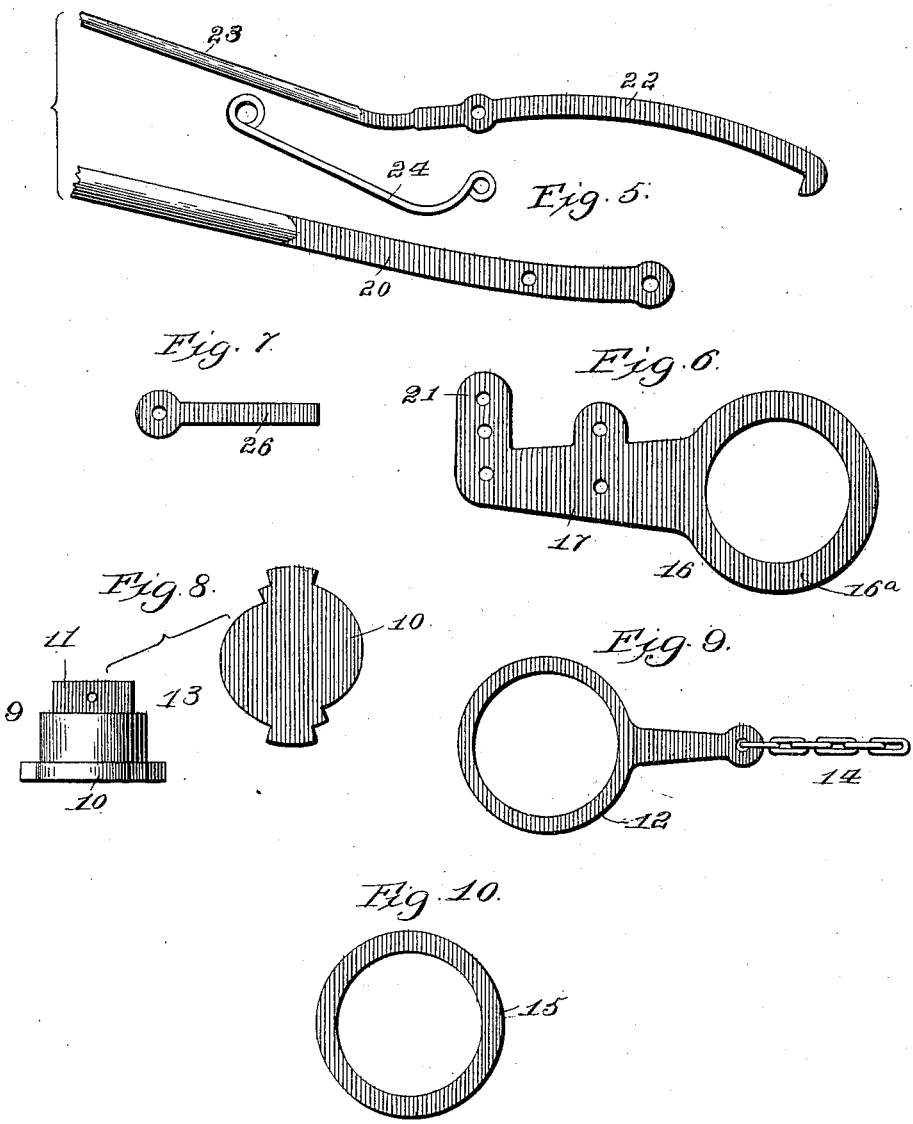

UNITED STATES PATENT OFFICE.

CLARENCE E. ALVORD, OF DENVER, COLORADO, ASSIGNOR TO MARSHALL P. GETCHELL, OF GUNNISON, COLORADO.

SAGE-BRUSH GRUBBER.

SPECIFICATION forming part of Letters Patent No. 610,296, dated September 6, 1898.

Application filed April 22, 1897. Serial No. 633,265. (No model.)

*To all whom it may concern:*

Be it known that I, CLARENCE E. ALVORD, a citizen of the United States, and a resident of Denver, in the county of Arapahoe and State of Colorado, have invented certain new and useful Improvements in Sage-Brush Grubbers, of which the following is a full, clear, and exact specification.

This invention relates to a machine for uprooting and removing from the ground sagebrush or other vegetable growth, and particularly to that class of machines which employ a double series of teeth mounted in a frame which is reversible at will in order to present a new set of teeth to the work and pass the other set back to be stripped of the accumulation.

The invention consists in certain novel features of construction, which will be hereinafter fully described, and particularly pointed out in the claim.

In the accompanying drawings, Figure 1 is a perspective view of an implement constructed in accordance with my invention. Fig. 2 is a plan of the same. Figs. 3 and 4 are vertical transverse sections taken, respectively, on the lines 3 3 and 4 4 of Fig. 2. Fig. 5 represents a controlling-handle, the detent, and the spring for holding the detent into engagement with the gudgeon. Fig. 6 is a view of the arm upon which the controlling-handle, &c., are mounted. Fig. 7 represents the pawl which prevents the implement turning backward. Fig. 8 represents by top and side view the gudgeon. Fig. 9 represents one of the pair of draft-rings. Fig. 10 represents the friction-ring interposed between the draft-ring and the frame.

1 represents the gang-frame, preferably constructed of two parallel bars $1^a$, having mounted therein straight teeth 2 and teeth 3 with upturned ends. The ends of the teeth are turned in such a way that when the gang-frame is reversed the ends presented forward will always turn upward.

4 represents stripper-bars, of which there is one on either side of the gang-frame, and these bars are connected by rods 5. The bars are on opposite sides of the teeth, so that the bar which is presented forward will always be underneath the teeth and engaged by the ground and forced back, so that the rear bar will strip the rear teeth of accumulation. These bars have their ends bent, as shown at 6, in order to embrace the teeth adjacent to their ends and guide the bars in their sliding movement.

7 represents shoes secured on opposite sides of the bars $1^a$ by means of bolts 8, passing through said shoes and the bars, and these shoes project outward from their respective sides of the gang-frame when said sides are presented to the rearward, and their function is to set the gang-frame at such an angle that the teeth will enter the ground and perform the grubbing function. The gang-frame is provided with gudgeons 9, (see Fig. 8,) which comprise a head 10 and an attaching-flange 11. The flange 11 fits between the bars $1^a$, as shown in Figs. 2 and 4, and is there secured by the bolt 8.

12 represents draft-rings, which engage the rounded portions 13 of the gudgeons and receive the chains 14 and other means by which the implement is to be drawn.

15 represents friction rings or washers interposed between the draft-rings 12 and the bars $1^a$.

16 is a frame having a ring $16^a$, which engages the gudgeon, and a rearwardly-extending arm 17, to which is secured by bolts 18 and 19 a controlling-handle 20. The frame 16 is further provided with upturned end 21, to which is fulcrumed a retaining pawl or dog 22, which engages the head 10 of the gudgeon and holds the gang-frame against rotation or reversal until said pawl is raised out of engagement with said gudgeon through the medium of its handle 23.

24 represents a spring fixed at 25 to the frame 16 and engaging by its outer end with the handle 23 to hold the pawl 22 into engagement with the gudgeon.

26 represents a retaining-dog which engages behind the shoulder of the gudgeon and holds the latter against rotation backward.

It will be understood that upon the end of the gang-frame opposite the controlling-bars there need be no frame or other connections besides the gudgeon, draft-ring, and friction-ring.

Having thus described my invention, the following is what I claim as new therein and desire to secure by Letters Patent:

The combination with the frame comprising two parallel bars, a series of teeth extending from each of said bars, a gudgeon secured between said parallel bars at each end, locking projections on the outer end of said gudgeons, a side frame having an annular opening and a rearwardly-extending body portion, with integral upwardly-extending lugs, locking and operating dogs pivoted to said lugs, one of the gudgeons being journaled in the said opening in the side frame, one of said dogs having a rearwardly-extending operating-handle, a pair of runners secured to the respective parallel bars, and extending in opposite directions from said bars respectively, and a controlling-handle secured rigidly to the side frame.

CLARENCE E. ALVORD.

Witnesses:
WM. A. BOWLES,
T. C. WINN.